(12) United States Patent
Wu et al.

(10) Patent No.: US 11,652,978 B2
(45) Date of Patent: May 16, 2023

(54) DEPTH MAP GENERATION DEVICE

(71) Applicant: eYs3D Microelectronics, Co., Taipei (TW)

(72) Inventors: Ben Wu, Taipei (TW); Hong-Yeh Hsieh, Taipei (TW); Chih-Kao Chen, New Taipei (TW)

(73) Assignee: eYs3D Microelectronics, Co., Taipei (TW)

( * ) Notice: Subject to any disclaimer, the term of this patent is extended or adjusted under 35 U.S.C. 154(b) by 0 days.

(21) Appl. No.: 15/862,659

(22) Filed: Jan. 5, 2018

(65) Prior Publication Data

US 2018/0227575 A1    Aug. 9, 2018

Related U.S. Application Data

(60) Provisional application No. 62/486,471, filed on Apr. 18, 2017, provisional application No. 62/442,941, filed on Jan. 5, 2017.

(51) Int. Cl.
| | |
|---|---|
| *H04N 13/271* | (2018.01) |
| *H04N 13/243* | (2018.01) |
| *G06T 5/00* | (2006.01) |
| *G06T 5/50* | (2006.01) |
| *H04N 13/296* | (2018.01) |
| *G06T 7/593* | (2017.01) |
| *H04N 13/106* | (2018.01) |
| *H04N 13/00* | (2018.01) |

(52) U.S. Cl.
CPC ........... *H04N 13/271* (2018.05); *G06T 5/002* (2013.01); *G06T 5/50* (2013.01); *G06T 7/596* (2017.01); *H04N 13/158* (2018.05); *H04N 13/243* (2018.05); *H04N 13/296* (2018.05); *G06T 2207/10012* (2013.01); *G06T 2207/10028* (2013.01); *G06T 2207/20221* (2013.01); *H04N 2013/0081* (2013.01)

(58) Field of Classification Search
USPC ........................................................ 348/139
See application file for complete search history.

(56) References Cited

U.S. PATENT DOCUMENTS

| | | | | |
|---|---|---|---|---|
| 2014/0184640 | A1* | 7/2014 | Putraya | H04N 5/23238 345/629 |
| 2014/0267243 | A1* | 9/2014 | Venkataraman | G06T 7/557 345/419 |
| 2016/0182893 | A1* | 6/2016 | Wan | H04N 13/246 348/50 |
| 2019/0236796 | A1* | 8/2019 | Blasco Claret | G06T 7/557 |

FOREIGN PATENT DOCUMENTS

TW        I542191 B        7/2016

* cited by examiner

*Primary Examiner* — Mikhail Itskovich
(74) *Attorney, Agent, or Firm* — Winston Hsu

(57) ABSTRACT

A depth map generation device includes a plurality of image capture pairs, a depth map generation module, and a processor. The depth map generation module is coupled to the plurality of image capture pairs for generating a plurality of depth maps corresponding to the plurality of image capture pairs according to the image pairs captured by the plurality of image capture pairs. The processor is coupled to the depth map generation module for optionally outputting a depth map of the plurality of depth maps, or outputting a blending depth map composed of a part or all of the plurality of depth maps.

8 Claims, 12 Drawing Sheets

DEPTH MAP GENERATION DEVICE

CROSS REFERENCE TO RELATED APPLICATION

This application claims the benefit of U.S. Provisional Application No. 62/442,941, filed on Jan. 5, 2017 and entitled "Distance measurement and image processing system," and the benefit of U.S. Provisional Application No. 62/486,471, filed on Apr. 18, 2017 and entitled "Full Range Depth-Map Capturing System," the contents of which are incorporated herein by reference.

BACKGROUND OF THE INVENTION

1. Field of the Invention

The present invention relates to a depth map generation device, and particularly to a depth map generation device that can provide a depth map with larger working range.

2. Description of the Prior Art

In the prior art, a depth map generation device utilizes a first image (e.g. a left eye image) and a second image (e.g. a right eye image) captured by a first image capturer (e.g. a left eye image capturer) and a second image capturer (e.g. a right eye image capturer) included in depth map generation device respectively to generate a depth map including an interested object. Because a baseline exists between the first image capturer and the second image capturer, the depth map has a corresponding working range (that is, a valid area of the depth map). Therefore, when the interested object is moved arbitrarily, the interested object may be moved outside the corresponding working range (that is, an invalid area of the depth map), resulting in the depth map generation device not outputting depth corresponding to the interested object. Therefore, how to make the depth map generation device dynamically change the corresponding working range of the depth map generated by the depth map generation device according to motion of the interested object, or generate a depth map with larger working range according to motion of the interested object has become an important issue.

SUMMARY OF THE INVENTION

An embodiment of the present invention provides a depth map generation device. The depth map generation device includes a plurality of image capture pairs, a depth map generation module, and a processor. The depth map generation module is coupled to the plurality of image capture pairs for generating a plurality of depth maps corresponding to the plurality of image capture pairs according to image pairs captured by the plurality of image capture pairs. The processor is coupled to the depth map generation module for optionally outputting one depth map of the plurality of depth maps, or outputting a blending depth map composed of a part or all of the plurality of depth maps.

Another embodiment of the present invention provides a depth map generation device. The depth map generation device includes a plurality of image capture pairs, a depth map generation module, and a processor. The depth map generation module is coupled to the plurality of image capture pairs for generating a plurality of depth maps corresponding to the plurality of image capture pairs according to image pairs captured by the plurality of image capture pairs. The processor is coupled to the depth map generation module for optionally outputting one depth map of the plurality of depth maps.

Another embodiment of the present invention provides a depth map generation device. The depth map generation device includes a plurality of image capture pairs, a depth map generation module, and a processor. The depth map generation module is coupled to the plurality of image capture pairs for generating a plurality of depth maps corresponding to the plurality of image capture pairs according to image pairs captured by the plurality of image capture pairs. The processor is coupled to a part of a plurality of depth map generators included in the depth map generation module for outputting a blending depth map formed by a part or all of the plurality of depth maps.

Another embodiment of the present invention provides a depth map generation device. The depth map generation device includes a plurality of depth map generators. The plurality of depth map generators includes a master depth map generator group and a slave depth map generator group. A slave depth map generator of the slave depth map generator group and a corresponding master depth map generator of the master depth map generator group form a master/slave pair, wherein the slave depth map generator and the corresponding master depth map generator receive image pairs captured by two image capture pairs outside the plurality of depth map generators, and accordingly generate a first depth map and a second depth map respectively, wherein the slave depth map generator transmits the first depth map to the corresponding master depth map generator, and the corresponding master depth map generator outputs the first depth map or the second depth map.

The present invention provides a depth map generation device. The depth map generation device can optionally output one depth map of a plurality of depth maps generated by the depth map generation device, or a blending depth map formed by a part or all of the plurality of depth maps according to depth of an interested object (or at least one interested object), so compared to the prior art, the present invention can dynamically change a working range of a depth map generated by the depth map generation device according to motion of the interested object, or generate a depth map with larger working range according to motion of the interested object.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
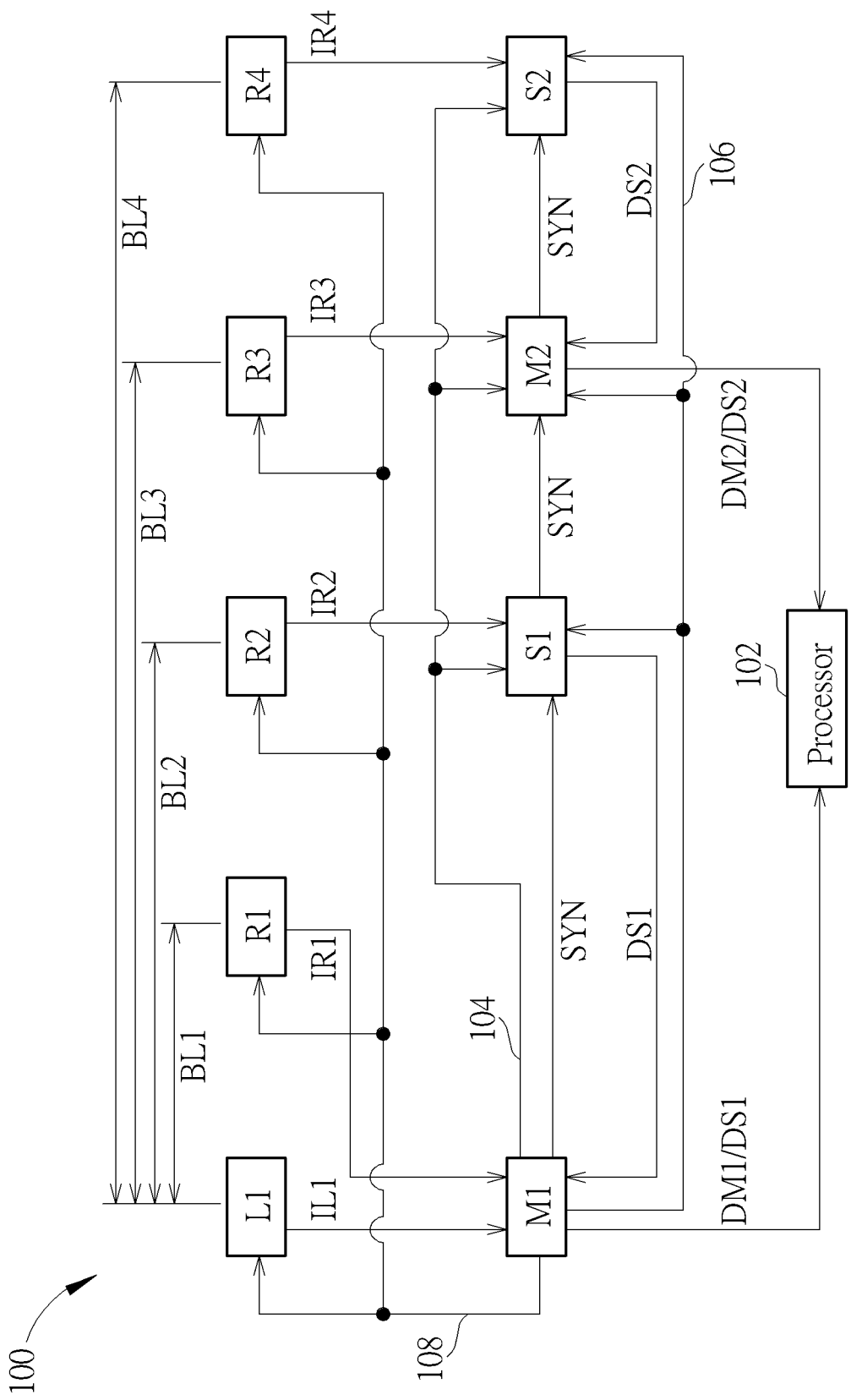
FIG. 1 is a diagram illustrating a depth map generation device according to a first embodiment of the present invention.

Please refer to FIG. 1. FIG. 1 is a diagram illustrating a depth map generation device 100 according to a first embodiment of the present invention. As shown in FIG. 1, the depth map generation device 100 includes a first image capturer L1, second image capturers R1-R4, depth map generators M1, S1, M2, S2, and a processor 102, wherein the depth map generators M1, M2 are master depth map generators, and the depth map generators S1, S2 are salve depth map generators. But, the present invention is not limited to the depth map generation device 100 only including the second image capturers R1-R4, that is, the depth map generation device 100 can include a plurality of second image capturers. As shown in FIG. 1, the first image capturer L1 and each second image capturer of the second image capturers R1-R4 form an image capture pair, respectively. For example, the first image capturer L1 and the second image capturers R1-R4 form a first image capture pair (L1, R1), a second image capture pair (L1, R2), a third image capture pair (L1, R3), and a fourth image capture pair (L1, R4), respectively. That is to say, the first image capture pair (L1, R1), the second image capture pair (L1, R2), the third image capture pair (L1, R3), and the fourth image capture pair (L1, R4) share the first image capturer L1, and each image capture pair of the first image capture pair (L1, R1), the second image capture pair (L1, R2), the third image capture pair (L1, R3), and the fourth image capture pair (L1, R4) corresponds to a baseline. For example, the first image capture pair (L1, R1), the second image capture pair (L1, R2), the third image capture pair (L1, R3), and the fourth image capture pair (L1, R4) correspond to a first baseline BL1, a second baseline BL2, a third baseline BL3, and a fourth baseline BL4 respectively, wherein the first baseline BL1, the second baseline BL2, the third baseline BL3, and the fourth baseline BL4 are different from each other. In addition, as shown in FIG. 1, the depth map generator M1 receives an image IL1 captured by the first image capturer L1 and an image IR1 captured by the second image capturer R1, and the depth map generator M1 transmits the image IL1 to the depth map generators S1, M2, S2 through a data bus 104. In addition, as shown in FIG. 1, the depth map generator M1 can trigger a time synchronization signal SYN to the depth map generator S1, then the depth map generator S1 transmits the time synchronization signal SYN to the depth map generator M2, and the depth map generator M2 transmits the time synchronization signal SYN to the depth map generator S2, wherein the depth map generator M1 can trigger the time synchronization signal SYN outputted to the depth map generators S1, M2, S2 through a control bus 106. In addition, the depth map generator M1 can also execute time synchronization on images captured by the first image capturer L1 and the second image capturers R1-R4 through a control bus 108.

As shown in FIG. 1, the depth map generator M1 can generate a depth map DM1 according to the image IL1 captured by the first image capturer L1, the image IR1 captured by the second image capturer R1, and an algorithm provided by the prior art (e.g. a semi-global block matching (SGBM) algorithm); the depth map generator S1 can generate a depth map DS1 according to the image IL1, an image IR2 captured by the second image capturer R2, and the algorithm; the depth map generator M2 can generate a depth map DM2 according to the image IL1, an image IR3 captured by the second image capturer R3, and the algorithm; and the depth map generator S2 can generate a depth map DS2 according to the image IL1, an image IR4 captured by the second image capturer R4, and the algorithm. In addition, the depth map generator S1 outputs the depth map DS1 and a serial number of the depth map generator S1 to the depth map generator M1, and the depth map generator M1 can insert the serial number of the depth map generator S1 to the depth map DS1 according to the time synchronization signal SYN (has been triggered by the depth map generator M1 through the control bus 106) to make the depth map DS1 be synchronized with the depth map DM1 in time. But, in another embodiment of the present invention, the depth map generator S1 inserts the serial number of the depth map generator S1 to the depth map DS1 according to the time synchronization signal SYN. But, in another embodiment of the present invention, the depth map generator S1 inserts a time stamp corresponding to the depth map generator S1 to the depth map DS1 according to the time synchronization signal SYN. Similarly, the depth map generator S2 outputs the depth map DS2 and a serial number of the depth map generator S2 to the depth map generator M2, and the depth map generator M2 can insert the serial number of the depth map generator S2 (or a time stamp corresponding to the depth map generator S2) to the depth map DS2 according to the time synchronization signal SYN (has been triggered by the depth map generator M1 through the control bus 106) to make the depth map DS2 be synchronized with the depth map DM2 in time. Then, the depth map generator M1 can output the depth map DM1 and the depth map DS1 to the processor 102 and the depth map generator M2 can output the depth map DM2 and the depth map DS2 to the processor 102. That is to say, because the depth map generators M1, M2 are master depth map generators, and the depth map generators S1, S2 are slave depth map generators, the depth map generator S1 only outputs the depth map DS1 to a master depth map generator (that is, the depth map generator M1) corresponding to the depth map generator S1, and the depth map generator S2 only outputs the depth map DS2 to a master depth map generator (that is, the depth map generator M2) corresponding to the depth map generator S2. In addition, in another embodiment of the present invention, the depth map generator M1 outputs the depth map DM1 to the processor 102, the depth map generator S1 outputs the depth map DS1 to the processor 102, the depth map generator M2 outputs the depth map DM2 to the processor 102, and the depth map generator S2 outputs the depth map DS2 to the processor 102.

In addition, the present invention is not limited to the above mentioned configurations of the first image capture pair (L1, R1), the second image capture pair (L1, R2), the third image capture pair (L1, R3), and the fourth image capture pair (L1, R4). That is to say, any configuration in which the first image capturer L1 and the second image capturers R1-R4 form 4 image capture pairs (e.g. L1 & R1, R1 & R2, R2 & R3, R3 & R4) coupled to the depth map generators M1, S1, M2, S2 respectively falls within the scope of the present invention.

In addition, after the processor 102 receives the depth maps DM1, DS1, DM2, DS2, the processor 102 can process the depth maps DM1, DS1, DM2, DS2 together (because the time synchronization is executed on the depth maps DM1, DS1, DM2, DS2 according to the time synchronization signal SYN). In one embodiment of the present invention, because the depth maps DM1, DS1, DM2, DS2 correspond to different working ranges, the processor 102 can optionally output one depth map of the depth maps DM1, DS1, DM2, DS2 according to a distance (that is, depth corresponding to an interested object (or at least one interested object)) between the interested object and the depth map generation device 100 and working ranges of the depth maps DM1, DS1, DM2, DS2. That is, the processor 102 further has a depth detection function, so the processor 102 can first utilize a part or all of the depth maps DM1, DS1, DM2, DS2 to determine the depth of the interested object. After the processor 102 determines the depth of the interested object, the processor 102 can optionally outputs one depth map of the depth maps DM1, DS1, DM2, DS2 according to the depth of the interested object and the working ranges of the depth maps DM1, DS1, DM2, DS2. For example, when the depth of the interested object falls within the working range of the depth map DM1, the processor 102 can output the depth map DM1 according to the depth of the interested object and the working ranges of the depth maps DM1, DS1, DM2, DS2. However, in another embodiment of the present invention, when the depth of the interested object simultaneously falls within the working ranges of depth maps DM1, DS1, DM2 (the depth maps DM1, DS1, DM2 are the part of the depth maps DM1, DS1, DM2, DS2) because the interested object moves, the processor 102 can output a blending (stitching) depth map formed by partial blocks of each depth map of the depth maps DM1, DS1, DM2 or by the complete each depth map of the depth maps DM1, DS1, DM2 according to the depth of the interested object and the working ranges of the depth maps DM1, DS1, DM2, DS2, so the processor 102 can reduce a data rate thereof by outputting the blending depth map. In addition, because the processor 102 can utilize the partial blocks of the each depth map of the depth maps DM1, DS1, DM2 or the complete each depth map of the depth maps DM1, DS1, DM2 to form the blending (stitching) depth map, compared to the prior art, a working range of the blending (stitching) depth map is greater than a working range of each depth map of the depth maps DM1, DS1, DM2. In addition, in another embodiment of the present invention, when the depth of the interested object simultaneously falls within the working ranges of depth maps DM1, DS1, DM2, DS2 because the interested object moves, the processor 102 can output a blending (stitching) depth map formed by partial blocks of each depth map of the depth map DM1, DS1 or by complete each depth map of the depth maps DM2, DS2 according to the depth of the interested object and the working ranges of the depth maps DM1, DS1, DM2, DS2. In addition, in another embodiment of the present invention, when the depth of the interested object simultaneously falls within the working ranges of depth maps DM1, DS1, DM2, DS2 because the interested object moves, the processor 102 can output a blending (stitching) depth map formed by partial blocks of each depth map of the depth maps DM1, DS1, DM2, DS2 or by the complete each depth map of the depth maps DM1, DS1, DM2, DS2 according to the depth of the interested object and the working ranges of the depth maps DM1, DS1, DM2, DS2.

Figure 2:
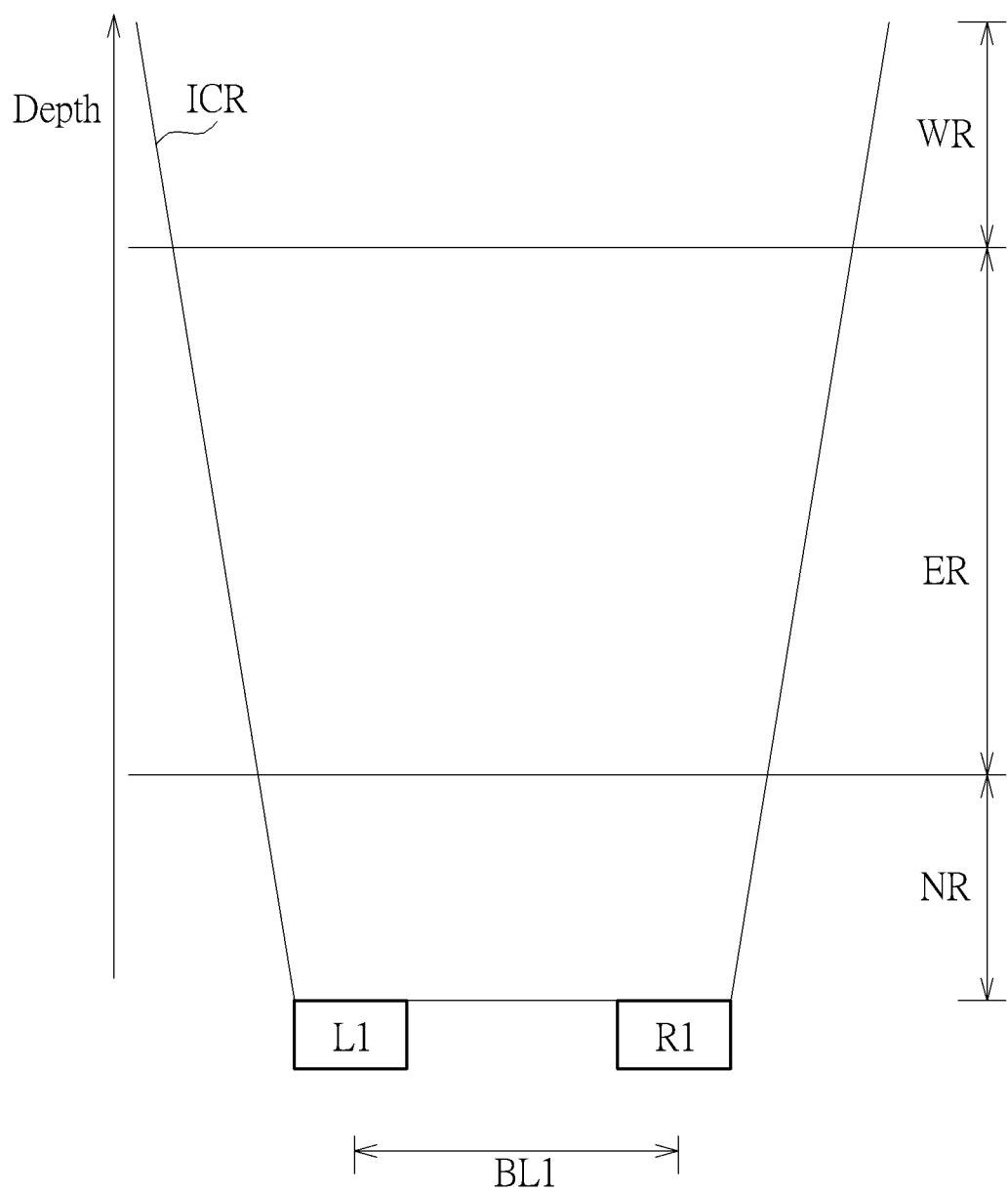
FIG. 2 is a diagram illustrating a non-effective range, an effective range, and a weak range corresponding to the depth map.

In addition, please refer to FIG. 2. FIG. 2 is a diagram illustrating a non-effective range NR, an effective range ER, and a weak range WR of the depth map DM1, wherein the non-effective range NR, the effective range ER, and the weak range WR of the depth map DM1 are determined by the first baseline BL1, the effective range ER and the weak range WR of the depth map DM1 are the working range of the depth map DM1, and the first image capturer L1 and the second image capturer R1 have an image capture range ICR. As shown in FIG. 2, if an object is located within the non-effective range NR, the processor 102 cannot determine a distance (that is, depth of the object) between the object and the depth map generation device 100 according to the depth map DM1, or the processor 102 will misjudge the distance between the object and the depth map generation device 100 according to the depth map DM1; if the object is located within the effective range ER, the processor 102 can clearly determine the distance between the object and the depth map generation device 100 according to the depth map DM1; and if the object is located within the weak range WR, the processor 102 does not clearly determine the distance between the object and the depth map generation device 100, but does also not misjudge the distance between the object and the depth map generation device 100 according to the depth map DM1.

Therefore, in another embodiment of the present invention, when the processor 102 receives the depth maps DM1, DS1, DM2, DS2, the processor 102 can process the depth maps DM1, DS1, DM2, DS2 together. Because the depth maps DM1, DS1, DM2, DS2 have different non-effective ranges, effective ranges, and weak ranges, the processor 102 can optionally output a depth map of the depth maps DM1, DS1, DM2, DS2 according to the depth of the interested object within the depth maps DM1, DS1, DM2, DS2 and the non-effective ranges, the effective ranges, and the weak ranges of the depth maps DM1, DS1, DM2, DS2. For example, when the depth of the interested object falls within the effective range of the depth map DM1, the processor 102 can output the depth map DM1 according to the depth of the interested object and the non-effective ranges, the effective ranges, and the weak ranges of the depth maps DM1, DS1, DM2, DS2. In addition, for example, when the depth of the interested object simultaneously falls within the effective range of the depth maps DM1, DS1, DM2 (that is, the part of the depth maps DM1, DS1, DM2, DS2) because the interested object moves, the processor 102 can output a blending (stitching) depth map formed by partial blocks of each depth map of the depth maps DM1, DS1, DM2 (wherein the partial blocks of the each depth map correspond to an effective range of the each depth map) according to the depth of the interested object and the non-effective ranges, the effective ranges, and the weak ranges of the depth maps DM1, DS1, DM2, DS2, so the processor 102 can reduce the data rate thereof by outputting the blending depth map.

In addition, before the depth map generator M1 outputs the depth map DM1 to the processor 102, the depth map generator M1 can execute calibration operation on the depth map DM1, wherein the calibration operation includes at least one of color calibration and geometric calibration, and the color calibration and the geometric calibration are obvious to one of ordinary skill in the art, so further description thereof is omitted for simplicity. In addition, before the depth map generator M1 outputs the depth map DM1 to the processor 102, the depth map generator M1 can also execute an image process on the depth map DM1, and the image process includes at least one of color interpolation, color processing, auto exposure (AE), and auto white balance (AWB) control, and the color interpolation, the color processing, the auto exposure, and the auto white balance control are also obvious to one of ordinary skill in the art, so further description thereof is omitted for simplicity. In addition, the depth map generator M1 can be a field programmable gate array (FPGA) with the above mentioned functions of the depth map generator M1, or an application-specific integrated circuit (ASIC) with the above mentioned functions of the depth map generator M1, or a software module for executing the above mentioned functions of the depth map generator M1. In addition, in another embodiment of the present invention, the depth map generation device 100 can utilize another field programmable gate array with the above mentioned functions of the calibration operation and the image process, or another application-specific integrated circuit with the above mentioned functions of the calibration operation and the image process, or another software module for executing the above mentioned functions of the calibration operation and the image process to execute the calibration operation and the image process on the image IL1 and the image IR1 before the depth map generator M1 generates the depth map DM1. In addition, principles of the depth map generators S1, M2, S2 executing the calibration operation and the image process are the same as those of the depth map generator M1, so further description thereof is omitted for simplicity.

In addition, in another embodiment of the present invention, the first image capture pair, the second image capture pair, the third image capture pair, and the fourth image capture pair do not share the first image capturer L1. That is, the depth map generation device 100 includes 4 first image capturers, and each image capture pair of the first image capture pair, the second image capture pair, the third image capture pair, and the fourth image capture pair has a corresponding first image capturer, respectively.

In addition, the processor 102 can be a field programmable gate array with the above mentioned functions of the processor 102, or an application-specific integrated circuit with the above mentioned functions of the processor 102, or a software module for executing the above mentioned functions of the processor 102.

Figure 3:
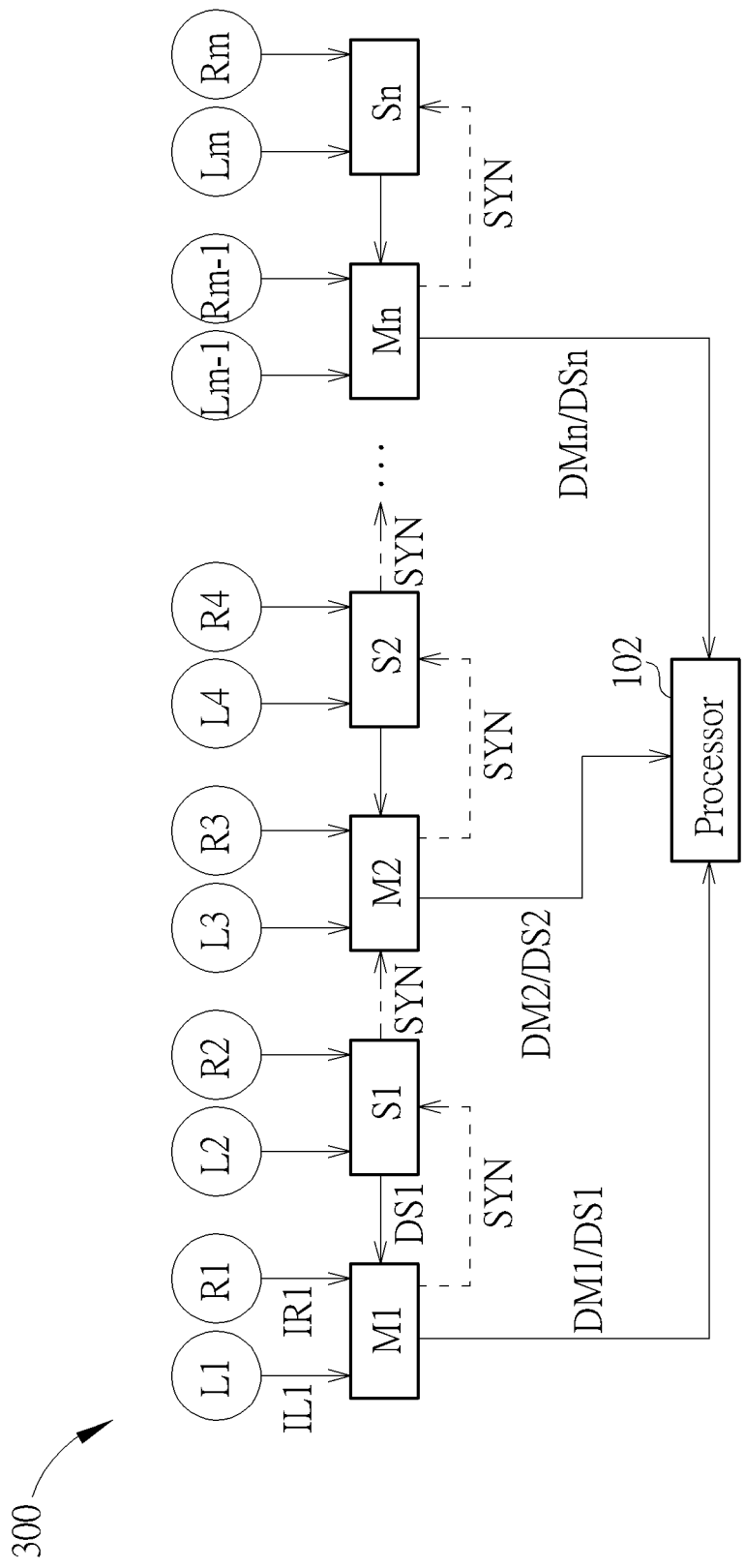
FIG. 3 is a diagram illustrating a depth map generation device according to a second embodiment of the present invention.

Please refer to FIG. 3. FIG. 3 is a diagram illustrating a depth map generation device 300 according to a second embodiment of the present invention. As shown in FIG. 3, the depth map generation device 300 includes m first image capturers L1-Lm, m second image capturers R1-Rm, m depth map generators M1-Mn, S1-Sn, and the processor 102, wherein m is a positive even number, n is equal to m/2, and the depth map generators M1-Mn, S1-Sn are included in a depth map generation module. As shown in FIG. 3, each first image capturer of the first image capturers L1-Lm and a corresponding second image capturer of the second image capturers R1-Rm form an image capture pair, and the image capture pair is coupled to a corresponding depth map generator of the depth map generators M1-Mn, S1-Sn. In addition, m image capture pairs formed by the first image capturers L1-Lm and the second image capturers R1-Rm correspond to different baselines, and the different baselines are different from each other. For example, as shown in FIG. 3, the first image capturer L1 and the second image capturer R1 form an image capture pair, and the image capture pair formed by the first image capturer L1 and the second image capturer R1 is coupled to the depth map generator M1. Then, the depth map generator M1 can generate the depth map DM1 according to the image IL1 captured by the first image capturer L1 and the image IR1 captured by the second image capturer R1. Therefore, the depth map generators M2-Mn, S1-Sn can generate depth maps DM2-DMn, DS1-DSn according to the above mentioned principle of the depth map generator M1 generating the depth map DM1. In addition, in another embodiment of the present invention, the depth map generation device 300 only includes one first image capturer, and the second image capturers R1-Rm share the first image capturer. In addition, operation principles of the first image capturers L1-Lm, the second image capturers R1-Rm, the depth map generators M1-Mn, S1-Sn, and the processor 102 can be referred to operation principles of the first image capturer L1, the second image capturers R1-R4, the depth map generators M1, S1, M2, S2, and the processor 102 of the depth map generation device 100, so further description thereof is omitted for simplicity.

Figure 4:
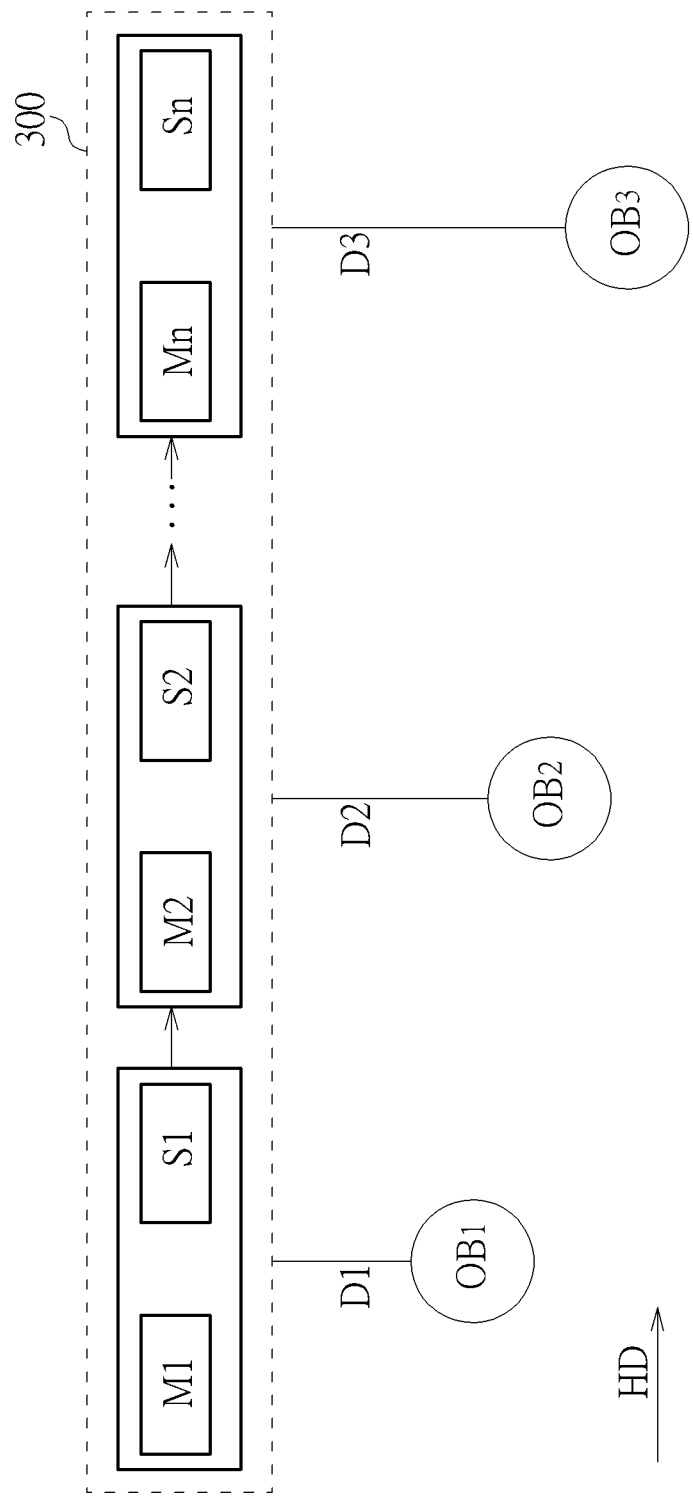
FIG. 4 is a diagram illustrating the m image capture pairs of the depth map generation device having a horizontal arrangement structure.
Figure 5:
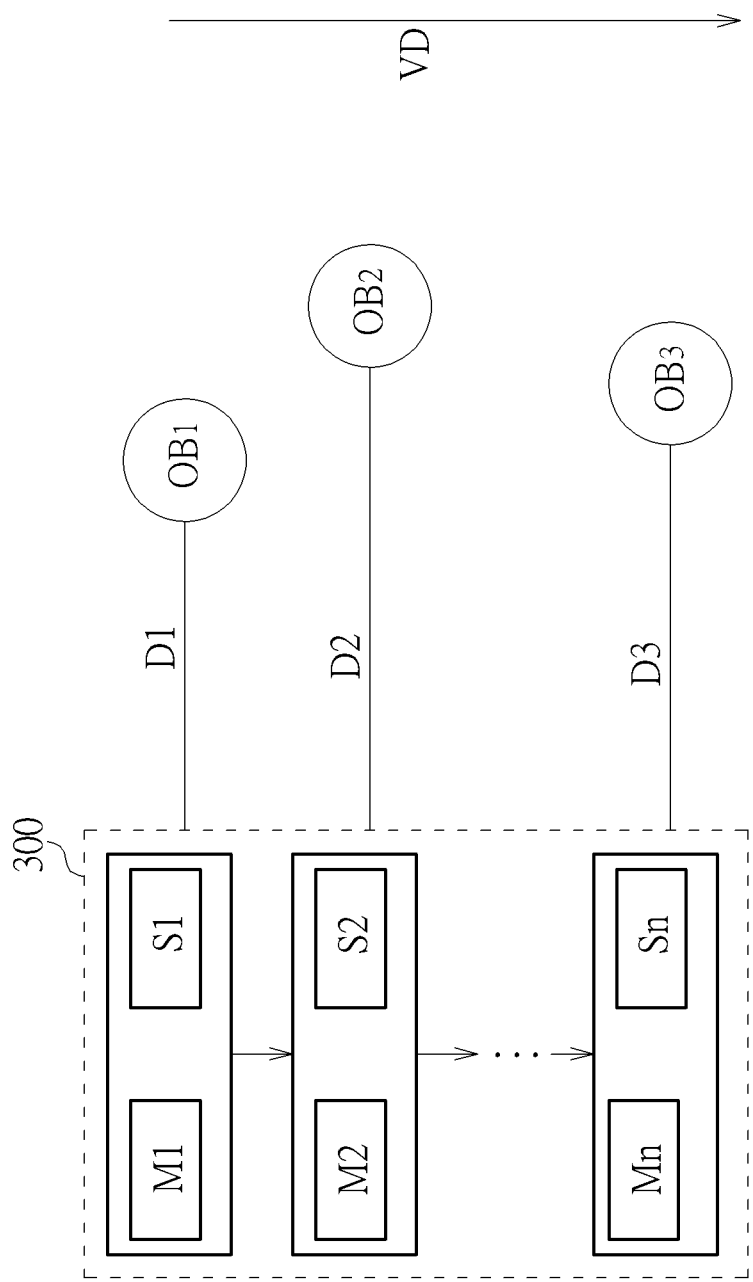
FIG. 5 is a diagram illustrating the m image capture pairs of the depth map generation device having a vertical arrangement structure.
Figure 6:
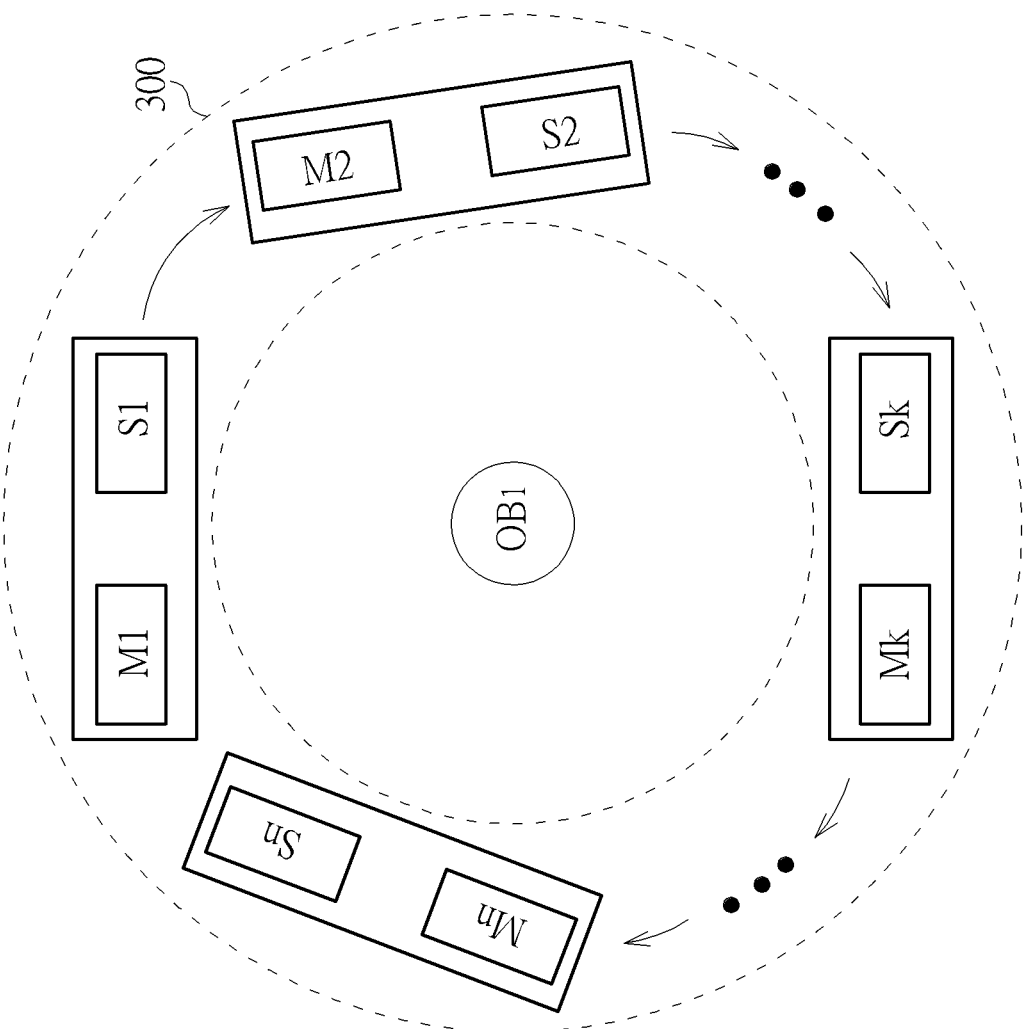
FIG. 6 is a diagram illustrating the m image capture pairs of the depth map generation device having a ring arrangement structure.

Please refer to FIGS. 4-6. FIG. 4 is a diagram illustrating the m image capture pairs of the depth map generation device 300 having a horizontal arrangement structure, FIG. 5 is a diagram illustrating the m image capture pairs of the depth map generation device 300 having a vertical arrangement structure, and FIG. 6 is a diagram illustrating the m image capture pairs of the depth map generation device 300 having a ring arrangement structure, wherein for simplifying FIGS. 4-6, so the depth map generation device 300 shown in FIGS. 4-6 only include the m image capture pairs. As shown in FIG. 4, 3 interested objects OB1-OB3 are located at a horizontal direction HD of an image capture range ICR of the depth map generation device 300, wherein distances D1-D3 exist between the interested objects OB1-OB3 and the depth map generation device 300, respectively. Because the m image capture pairs have the horizontal arrangement structure and the m image capture pairs correspond to different baselines, the depth map generation device 300 can generate a depth map corresponding to each interested object of the interested objects OB1-OB3 according to image pairs captured by the m image capture pairs (that is, the depth map generation device 300 shown in FIG. 4 is suitable for a plurality of interested objects being located at the horizontal direction HD of the image capture range ICR of the depth map generation device 300), wherein the depth map corresponding to the each interested object can be one depth map of the depth maps DM1-DMn, DS1-DSn, or a blending depth map formed by partial blocks of each depth map of a part or all of the depth maps DM1-DMn, DS1-DSn. In addition, if the interested objects OB1-OB3 are close to each other within the image capture range ICR, the depth map generation device 300 will output one depth map of the depth maps DM1-DMn, DS1-DSn simultaneously including the interested objects OB1-OB3.

As shown in FIG. 5, the m image capture pairs have the vertical arrangement structure (that is, the m image capture pairs have a cascade arrangement structure), and the interested objects OB1-OB3 are located at a vertical direction VD of the image capture range ICR of the depth map generation device 300. Because the m image capture pairs have the vertical arrangement structure and the m image capture pairs correspond to different baselines, the depth map generation device 300 can generate a depth map corresponding to each interested object of the interested objects OB1-OB3 according to image pairs captured by the m image capture pairs. That is to say, the depth map generation device 300 shown in FIG. 5 is suitable for a plurality of interested objects (e.g. crowns, stems, roots, and so on of a large tree) being located at the vertical direction VD of the image capture range ICR of the depth map generation device 300.

As shown in FIG. 6, because the m image capture pairs have the ring arrangement structure, the depth map generation device 300 shown in FIG. 6 can generate a depth map surrounding the interested object OB1, wherein the depth map surrounding the interested object OB1 can be used for generating a three-dimensional scan result of the interested object OB1. In addition, the interested object OB1 can be located at a center of the ring arrangement structure, or any position within the ring arrangement structure. In addition, FIG. 6 takes the interested object OB1 as an example to describe the present invention, but the depth map generation device 300 shown in FIG. 6 can be also suitable for a plurality of interested objects located within the ring arrangement structure, and the plurality of interested objects can be located at any position within the ring arrangement structure.

In addition, in another embodiment of the present invention, because the processor 102 is a processor (e.g. a graphics processing unit, GPU) having high operation capability and large-capacity frame buffer, the processor 102 can merge a part or all of the depth maps DM1-DMn, DS1-DSn generated by the depth map generators M1-Mn, S1-Sn into a blending depth map according to depth of an interested object. After the processor 102 merges the part or the all of the depth maps DM1-DMn, DS1-DSn, a data rate of the depth map generation device 300 can be reduced. Thus, bandwidth required by application software that utilizes the blending depth map can also be reduced.

Figure 7:
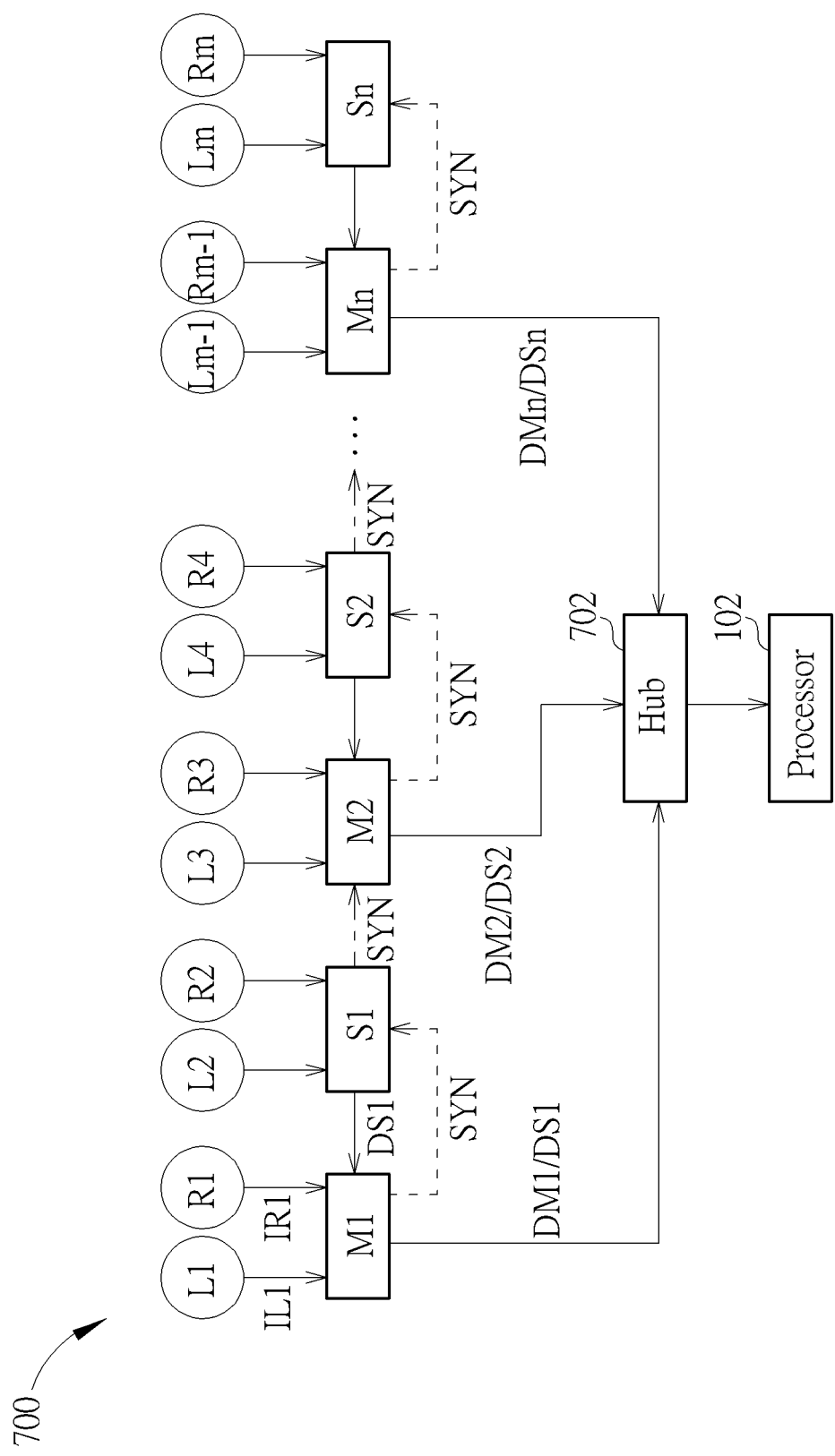
FIG. 7 is a diagram illustrating a depth map generation device according to a third embodiment of the present invention.
Figure 8:
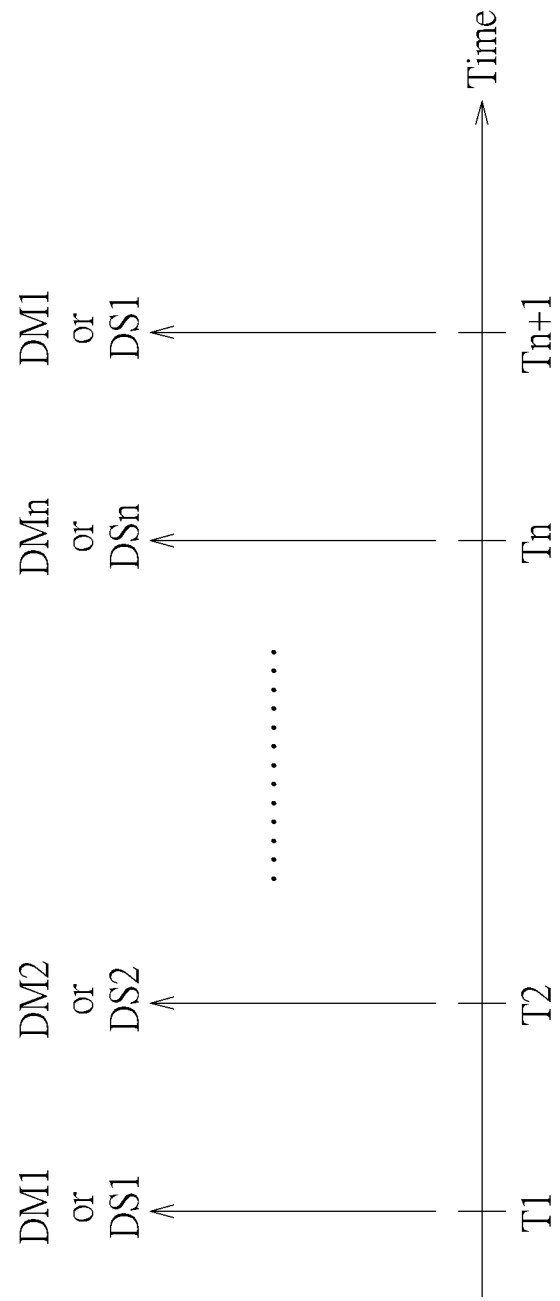
FIG. 8 is a diagram illustrating the processor only processing one depth map outputted by the depth map generator at one time point.

Please refer to FIG. 7. FIG. 7 is a diagram illustrating a depth map generation device 700 according to a third embodiment of the present invention. As shown in FIG. 7, a difference between the depth map generation device 700 and the depth map generation device 300 is that the depth map generation device 700 further includes a hub 702, wherein the hub 702 is coupled between the depth map generators M1-Mn (that is, the master depth map generators) and the processor 102, and the processor 102 utilizes a Round-Robin method to process the depth maps DM1-DMn, DS1-DSn through the hub 702. That is, the processor 102 one time processes one depth map of the depth maps DM1-DMn, DS1-DSn through the hub 702. For example, as shown in FIG. 8, the processor 102 processes the depth map DM1 or the depth map DS1 outputted by the depth map generator M1 at a time point T1, processes the depth map DM2 or the depth map DS2 outputted by the depth map generator M2 at a time point T2, and so on. After the processor 102 processes the depth map DMn or the depth map DSn outputted by the depth map generator Mn at a time point Tn, the processor 102 processes the depth map DM1 or the depth map DS1 outputted by the depth map generator M1 at a time point Tn+1 again. For example, in one embodiment of the present invention, the depth map generator M1 outputs the depth map DM1 or the depth map DS1 at 30 frames per second (operation principles of the depth map generators M2-Mn are the same as those of the depth map generator M1). That is, the processor 102 processes a depth map outputted by a depth map generator through the hub 702 every 1/30 seconds, so the processor 102 can completely process the depth maps DM1-DMn, DS1-DSn outputted by the depth map generators M1-Mn one time every n/30 seconds. In addition, as shown in FIG. 8, because the processor 102 only processes one depth map outputted by a depth map generator at a time point, bandwidth required by application software of the processor 102 for processing depth maps can be reduced. In addition, in another embodiment of the present invention, the processor 102 processes the depth map DM1 and the depth map DS1 outputted by the depth map generator M1 at the time point T1, processes the depth map DM2 and the depth map DS2 outputted by the depth map generator M2 at the time point T2, and so on. In addition, subsequent operation principles of the depth map generation device 700 are the same as those of the depth map generation device 300, so further description thereof is omitted for simplicity.

Figure 9:
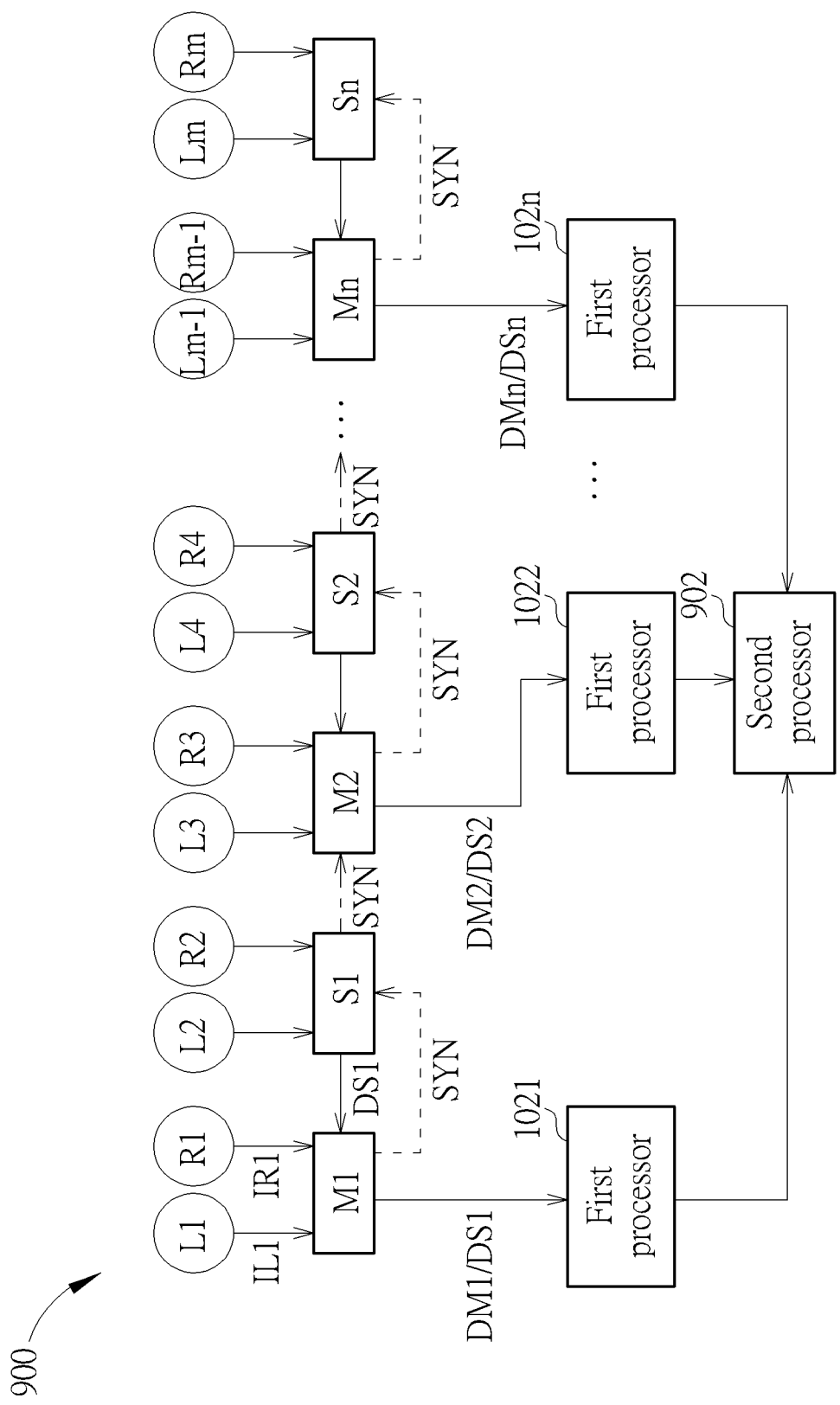
FIG. 9 is a diagram illustrating a depth map generation device according to a fourth embodiment of the present invention.

Please refer to FIG. 9. FIG. 9 is a diagram illustrating a depth map generation device 900 according to a fourth embodiment of the present invention. As shown in FIG. 9, a difference between the depth map generation device 900 and the depth map generation device 300 is that each depth map generator of the depth map generators M1-Mn (that is, the master depth map generators) of the depth map generation device 900 is coupled to a first processor. For example, the depth map generator M1 is coupled to a first processor 1021, the depth map generator M2 is coupled to a first processor 1022, and the depth map generator Mn is coupled to a first processor 102n. The first processor 1021 can detect depth of an interested object according to the depth maps DM1, DS1, and optionally outputs partial blocks of the depth maps DM1, DS1 (or outputs the depth maps DM1, DS1) to a second processor 902 according to the depth of the interested object and the working ranges of the depth maps DM1, DS1, or does not output the partial blocks of the depth maps DM1, DS1 to the second processor 902 (because the depth of the interested object falls outside the working ranges of the depth maps DM1, DS1). Therefore, the second processor 902 can process information (e.g. the partial blocks of the depth maps DM1, DS1 outputted by the first processor 1021) corresponding to the depth of the interested object outputted by the first processors 1021-102n to generate a blending depth map. For example, the second processor 902 can execute at least one of denoising, hole-filling, smoothing, and image compression on the information corresponding to the depth of the interested object outputted by the first processors 1021-102n to generate the blending depth map. In addition, in another embodiment of the present invention, the depth map generation device 900 can utilize another field programmable gate array with a function of at least one of denoising, hole-filling, smoothing, and image compression, or an application-specific integrated circuit with the function of the at least one of denoising, hole-filling, smoothing, and image compression, or a software module for executing the function of the at least one of denoising, hole-filling, smoothing, and image compression to execute the calibration operation and the image process on the image IL1 and the image IR1 before the depth map generator M1 generates the depth map DM1. In addition, in another embodiment of the present invention, the first processor 1021 can first execute the at least one of denoising, hole-filling, smoothing, and image compression on the depth maps DM1, DS1. In addition, because the first processor 1021 outputs the partial blocks of the depth maps DM1, DS1 to the second processor 902, a data rate of the second processor 902 for outputting the depth maps DM1, DS1 can be reduced, wherein the second processor 902 is included in a mobile device (e.g. a smart phone or a tablet personal computer). But, in another embodiment of the present invention, the second processor 902 is included in a remote device or a server on Internet. In addition, because the second processor 902 receives the partial blocks of the depth maps DM1, DS1, bandwidth required by application software within the second processor 902 that utilizes the partial blocks of the depth maps DM1, DS1 can be reduced. In addition, in one embodiment of the present invention, the second processor 902 can be included in the depth map generation device 900. In addition, the operation principles of the depth map generators M2-Mn are the same as those of the depth map generator M1, so further description thereof is omitted for simplicity. In addition, operation principles of the first processors 1022-102n are the same as those of the first processor 1021, so further description thereof is omitted for simplicity. In addition, subsequent operational principles of the depth map generation device 900 are the same as those of the depth map generation device 300, so further description thereof is omitted for simplicity.

Figure 10:
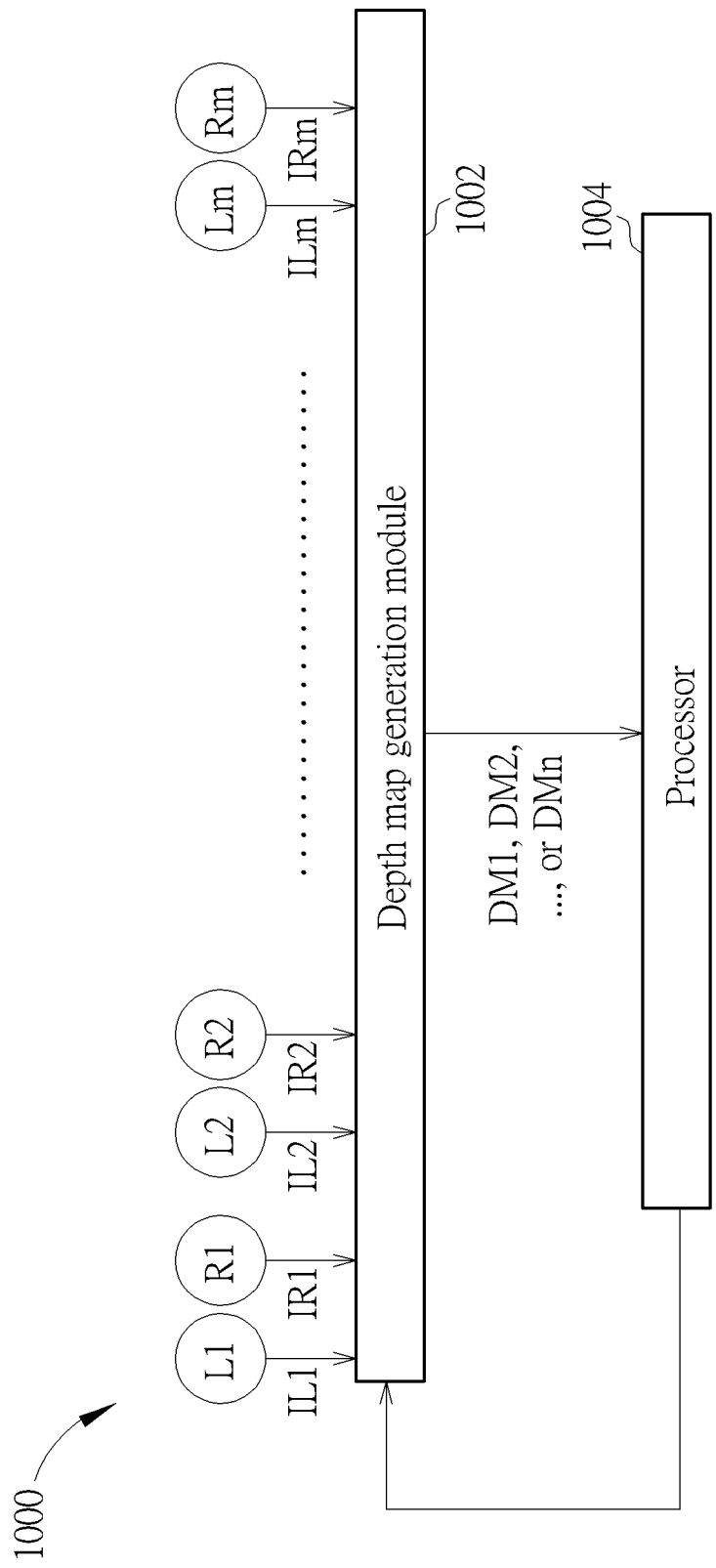
FIG. 10 is a diagram illustrating a depth map generation device according to a fifth embodiment of the present invention.

Please refer to FIG. 10. FIG. 10 is a diagram illustrating a depth map generation device 1000 according to a fifth embodiment of the present invention. As shown in FIG. 10, the depth map generation device 1000 includes the m first image capturers L1-Lm, the m second image capturers R1-Rm, a depth map generation module 1002, and a processor 1004, wherein the depth map generation module 1002 is coupled to the first image capturers L1-Lm and the second image capturers R1-Rm, the depth map generation module 1002 includes one depth map generator or a plurality of depth map generators, and the processor 1004 is coupled to the depth map generation module 1002. As shown in FIG. 10, each first image capturer of the m first image capturers L1-Lm and a corresponding second image capturer of the m second image capturers R1-Rm form an image capture pair. For example, the first image capturer L1 and the second image capturer R1 form an image capture pair, wherein each image capture pair of m image capture pairs formed by the m first image capturers L1-Lm and the m second image capturers R1-Rm corresponds to a different baseline. That is to say, for example, a baseline corresponding to the first image capturer L1 and the second image capturer R1 is not equal to a baseline corresponding to the first image capturer L2 and the second image capturer R2. Therefore, the processor 1004 can first control the depth map generation module 1002 to generate a depth map according to an image pair captured by a preset image capture pair. For example, the processor 1004 can first control the depth map generation module 1002 (when the depth map generation module 1002 only includes one depth map generator) or a first depth map generator of the depth map generation module 1002 (when the depth map generation module 1002 includes a plurality of depth map generators) to generate the depth map DM1 according to the image IL1 captured by the first image capturer L1 and the image IR1 captured by the second image capturer R1, wherein the first image capturer L1 and the second image capturer R1 are the preset image capture pair. Then, the processor 1004 determines depth of an interested object (or at least one interested object) according to the depth map DM1, and controls the depth map generation module 1002 whether to generate a corresponding depth map according to an image pair captured by another image capture pair accordingly. For example, when the processor 1004 determines that the depth map DM1 is not suitable for determining the depth of the interested object because the interested object moves, the processor 1004 can control the depth map generation module 1002 (when the depth map generation module 1002 only includes one depth map generator) or a second depth map generator of the depth map generation module 1002 (when the depth map generation module 1002 includes a plurality of depth map generators) to generate the depth map DM2 according to an image IL2 captured by the first image capturer L2 and an image IR2 captured by the second image capturer R2, or to generate the depth map DMm according to an image ILm captured by the first image capturer Lm and an image IRm captured by the second image capturer Rm. Therefore, the processor 1004 can dynamically control the depth map generation module 1002 to generate a proper depth map, wherein the proper depth map is suitable for determining a current depth of the interested object.

In addition, when the depth map generation module 1002 includes a plurality of depth map generators, the depth map generation module 1002 generates a preset depth map (e.g. the depth map DM1) according to the image pair captured by the preset image capture pair (e.g. the first image capturer L1 and the second image capturer R1), the processor 1004 determines the depth of the interested object according to the preset depth map, and the processor 1004 determines to marge a part or all of a plurality of depth maps generated by the depth map generation module 1002 according to image pairs captured by the plurality of image capture pairs formed by the first image capturers L1-Lm and the second image capturers R1-Rm to generate a blending depth map according to the depth of the interested object. But, in another embodiment of the present invention, the processor 1004 selects one of the plurality of depth maps to generate the blending depth map according to the depth of the interested object. In addition, when the depth map generation module 1002 is one depth map generator, the depth map generation module 1002 can generate the preset depth map (e.g. the depth map DM1) according to the image pair captured by the preset image capture pair (e.g. the first image capturer L1 and the second image capturer R1). Then, the processor 1004 can determine the depth of the interested object according to the preset depth map, and the processor 1004 can select one image capture pair of the plurality of image capture pairs formed by the first image capturers L1-Lm and the second image capturers R1-Rm according to the depth of the interested object to make the depth map generation module 1002 generate a first depth map according to the image pair captured by the image capture pair, and the processor 1004 outputs the first depth map. But, in another embodiment of the present invention, the processor 1004 determines whether to switch another image capture pair of the plurality of image capture pairs to capture an image pair to make the depth map generation module 1002 update the first depth map accordingly according to the depth of the interested object.

Figure 11:
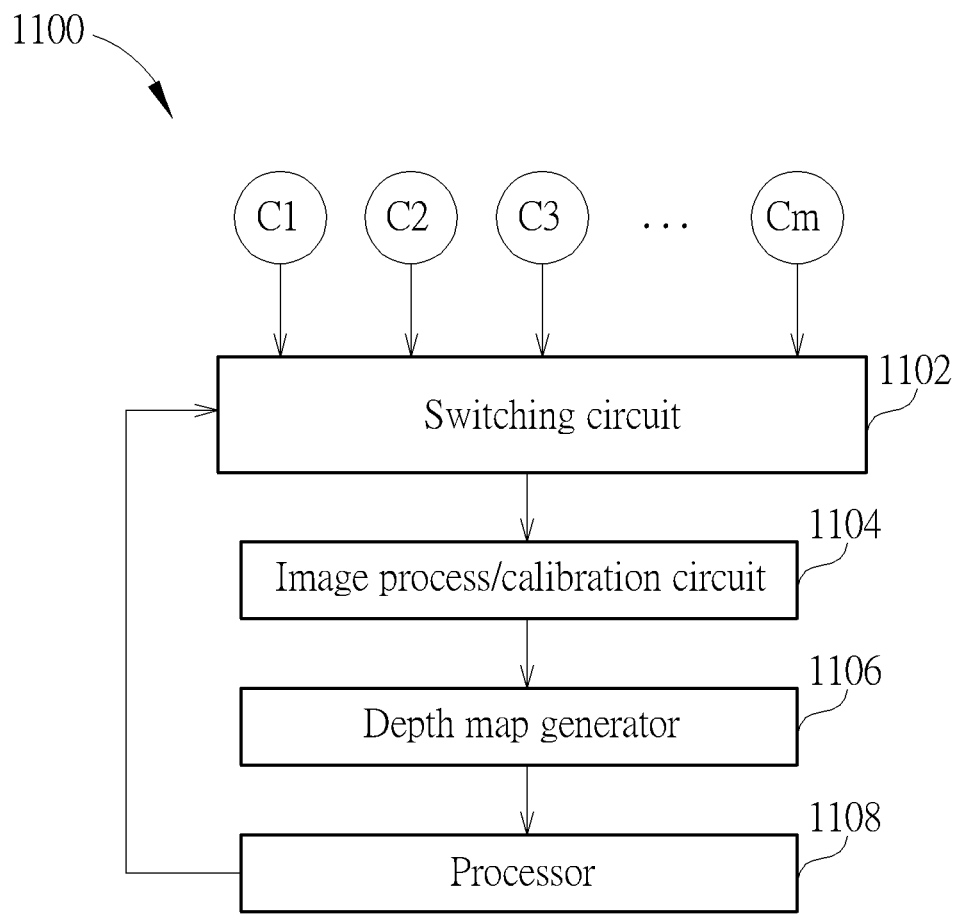
FIG. 11 is a diagram illustrating a depth map generation device according to a sixth embodiment of the present invention.

Please refer to FIG. 11. FIG. 11 is a diagram illustrating a depth map generation device 1100 according to a sixth embodiment of the present invention. As shown in FIG. 11, the depth map generation device 1100 includes m image capturers C1-Cm, a switching circuit 1102, an image process/calibration circuit 1104, a depth map generator 1106, and a processor 1108, wherein coupling relationships between the image capturers C1-Cm, the switching circuit 1102, the image process/calibration circuit 1104, the depth map generator 1106, and the processor 1108 can be referred to FIG. 11, so further description thereof is omitted for simplicity. As shown in FIG. 11, any two image capturers of the image capturers C1-Cm can form an image capture pair, and each image capture pair has a different baseline. Therefore, the processor 1108 can first control the depth map generator 1106 to generate a corresponding depth map according to an image pair captured by a preset image capture pair. For example, the processor 1108 can first control the depth map generator 1106 to generate a preset depth map according to an image pair captured by the image capturers C1, C2, wherein the image capturers C1, C2 are the preset image capture pair. But, the present invention is not limited to the image capturers C1, C2 being the preset image capture pair. For example, the preset image capture pair can also be an image capture pair (having a maximum working range) of the depth map generation device 1100. Then, the processor 1108 determines depth of an interested object (or at least one interested object) according to the preset depth map, and controls the switching circuit 1102 whether to receive an image pair captured by another image capture pair accordingly. For example, when the processor 1108 determines that the first depth map is not suitable for determining the depth of the interested object because the interested object moves, the processor 1108 can control the switching circuit 1102 to switch to receive the image pair captured by the another image capture pair. Then, the depth map generator 1106 generates a second depth map according to the image pair captured by the another image capture pair. Therefore, the processor 1108 can dynamically control the depth map generator 1106 to generate a proper depth map through the switching circuit 1102, wherein the proper depth map is suitable for determining a current depth of the interested object. In addition, a function of the image process/calibration circuit 1104 can be referred to the above mentioned calibration operation and the above mentioned image process, so further description thereof is omitted for simplicity. In addition, in another embodiment of the present invention, the switching circuit 1102 and the image process/calibration circuit 1104 can be integrated into the depth map generator 1106.

Figure 12:
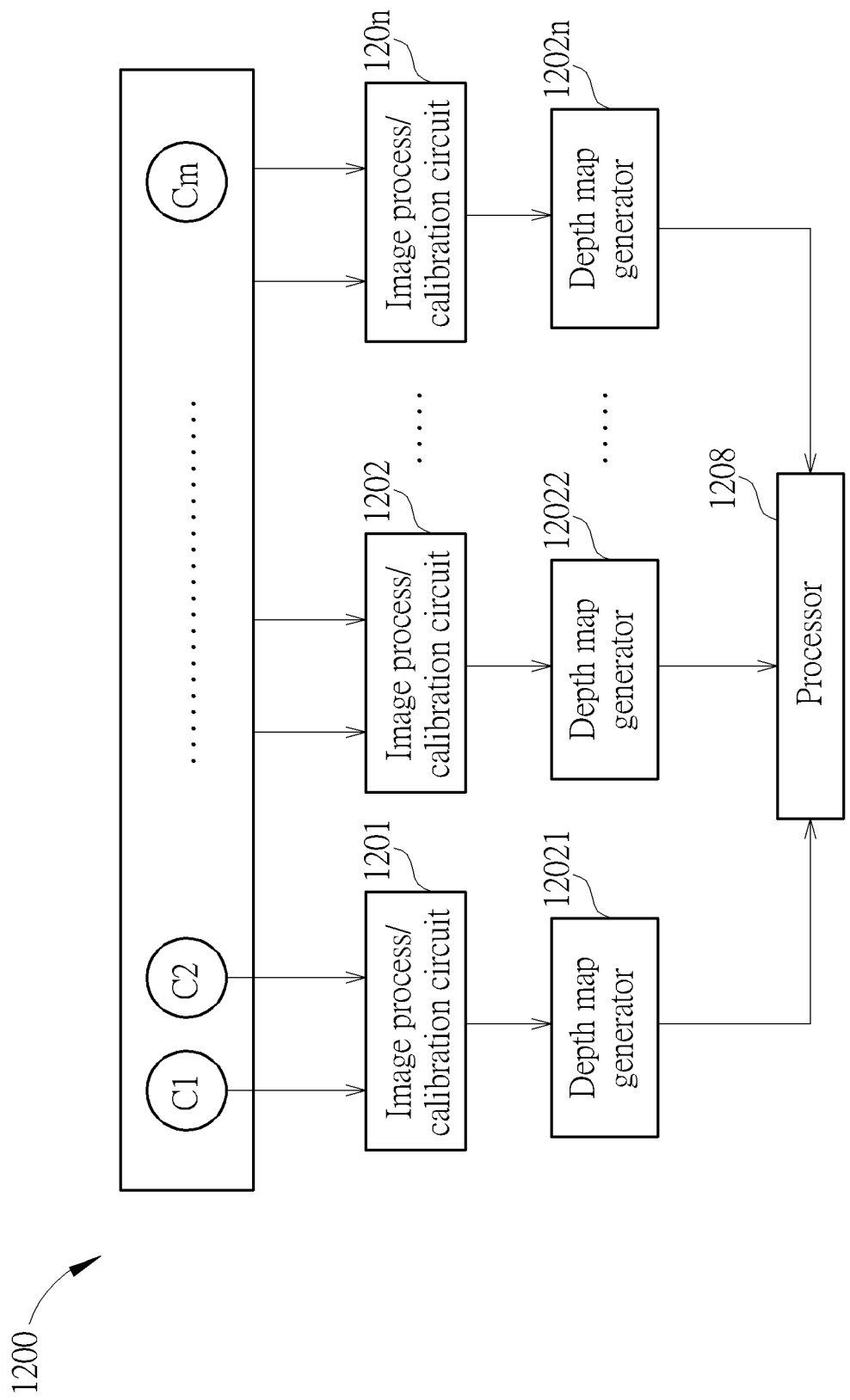
FIG. 12 is a diagram illustrating a depth map generation device 1200 according to a seventh embodiment of the present invention.

Please refer to FIG. 12. FIG. 12 is a diagram illustrating a depth map generation device 1200 according to a seventh embodiment of the present invention. As shown in FIG. 12, the depth map generation device 1200 includes the m image capturers C1-Cm, n image process/calibration circuits 1201-120$n$, n depth map generators 12021-1202$n$, and a processor 1208, wherein n, m are positive integers, n is less than m, and coupling relationships between the image capturers C1-Cm, the image process/calibration circuits 1201-120$n$, the depth map generators 12021-1202$n$, and the processor 1208 can be referred to FIG. 12, so further description thereof is omitted for simplicity. As shown in FIG. 12, any two image capturers of the image capturers C1-Cm can form an image capture pair, and the image capture pair is coupled to a corresponding image process/calibration circuit and a corresponding depth map generator. For example, the image process/calibration circuit 1201 is coupled to the image capturers C1, C2, and the depth map generator 12021 is coupled to the image process/calibration circuit 1201. Each depth map generator of the depth map generators 12021-1202$n$ can generate a corresponding depth map according to an image pair captured by an image capture pair corresponding to the each depth map generator. Then, the processor 1208 optionally outputs one depth map of n depth maps generated by the depth map generators 12021-1202$n$, or outputs a blending depth map formed by a part or all of the n depth maps according to depth of an interested object (or at least one interested object) and working ranges of the n depth maps. In addition, a function of the image process/calibration circuits 1201-120$n$ can be referred to the above mentioned calibration operation and the above mentioned image process, so further description thereof is omitted for simplicity. In addition, in another embodiment of the present invention, the image process/calibration circuits 1201-120$n$ can be integrated into the depth map generators 12021-1202$n$, respectively.

To sum up, because the depth map generation device provided by the present invention can optionally output one depth map of a plurality of depth maps generated by the depth map generation device, or a blending depth map formed by a part or all of the plurality of depth maps according to depth of an interested object (or at least one interested object), compared to the prior art, the depth map generation device provided by the present invention is more suitable for the following applications:

Games:

Because a working range of the blending depth map is greater than a working range of each depth map of the plurality of depth maps (that is, compared to the prior art, the working range of the blending depth map is larger), the present invention not only can support interactive games only controlled by gestures of a user, but can also support interactive games (e.g. sport games) that need the user often to move. Therefore, when the user plays the sport games, the user can add other body movements except head swing, hand waving, or foot kicking, such as moving forward and backward. That is, the present invention can provide a greater experience to the user when the user plays one interactive game (especially a virtual reality (VR) game).

Robot Application:

Because the working range of the blending depth map is larger, the present invention can increase a three-dimensional scanning range of a robot. For example, for a search/rescue robot, because a working range of a blending depth map generated by the search/rescue robot is larger, a search/rescue range of the search/rescue robot is also larger, resulting in search/rescue efficiency of the search/rescue robot being increased. Because the search/rescue efficiency of the search/rescue robot is increased, time for the search/rescue robot finding a survivor is reduced and probability for the search/rescue robot finding the survivor is increased.

In addition, the present invention is also suitable for a military robot or a scientific robot. Because the working range of the blending depth map is larger, the military robot (or the scientific robot) can search a larger range to find any interested object. In addition, because the working range of the blending depth map is larger, the military robot has a farther view. That is to say, the military robot can be hidden away from enemies without being discovered by the enemies when the military robot executes a military mission.

Monitor:

Because the working range of the blending depth map is larger, monitoring equipment utilizing the depth map generation device provided by the present invention can track an object within a larger view range, rather than easily missing the object. Therefore, the monitoring equipment can provide depth information of the object, and notice other monitoring equipment with zoom lenses to adjust focuses of the zoom lenses to capture a clear image of the object, wherein the clear image of the object is applied to a monitoring application.

Drone:

Because the working range of the blending depth map is larger, a drone utilizing the depth map generation device provided by the present invention can have more time to detect obstacles (e.g. trees, street lights, traffic signs, telephone poles, buildings, etc.) on a cruising path thereof and modify the cruising path to avoid the obstacles. Thus, the present invention can reduce crash probability of the drone because the drone impacts on the obstacles.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A depth map generation device, comprising:
- a plurality of image capture pairs, and the plurality of image capture pairs having different baselines, wherein the plurality of image capture pairs comprise:
  - at least one first image capturer; and
  - a plurality of second image capturers, each second image capturer and a corresponding first image capturer used for forming an image capture pair of the plurality of image capture pairs, and the plurality of image capture pairs used for sharing the corresponding first image capturer of the at least one first image capturer;
- a switching circuit;
- a depth map generation module coupled to the switching circuit, used for generating a plurality of depth maps corresponding to the plurality of image capture pairs according to image pairs captured by the plurality of image capture pairs, and the plurality of depth maps having different working ranges, wherein a working range of a depth map corresponding to each image capture pair is determined by a baseline of the each image capture pair; and
- a processor coupled to the depth map generation module and the switching circuit, used for controlling the switching circuit whether to receive an image pair captured by one image capture pair of the plurality of image capture pairs according to depth of a target object and the different working ranges, and outputs one depth map of the plurality of depth maps according to the image pair;
- wherein when an object is located within the working range of the depth map corresponding to the each image capture pair, the processor does not misjudge a distance between the object and the depth map generation device.

2. The depth map generation device of claim 1, wherein the depth map generation module is one depth map generator, the processor selects one image capture pair of the plurality of image capture pairs to make the depth map generator generate a first depth map according to an image pair captured by the image capture pair, and the processor outputs the first depth map.

3. The depth map generation device of claim 2, wherein the processor determines whether to switch another image capture pair of the plurality of image capture pairs to capture another image pair to make the depth map generator update the first depth map accordingly according to depth of at least one target object.

4. The depth map generation device of claim 2, wherein the depth map generator generates a preset depth map according to an image pair captured by a preset image capture pair, the processor determines depth of at least one target object according to the preset depth map, and the processor selects the image capture pair of the plurality of image capture pairs according to the depth of the at least one target object.

5. A depth map generation device, comprising:
- a plurality of image capture pairs, and the plurality of image capture pairs having different baseline;
- a switching circuit;
- a depth map generation module coupled to the switching circuit, used for generating a plurality of depth maps corresponding to the plurality of image capture pairs according to image pairs captured by the plurality of image capture pairs, and the plurality of depth maps having different working ranges, wherein a working range of a depth map corresponding to each image capture pair is determined by a baseline of the each image capture pair; and
- a processor coupled to the depth map generation module and the switching circuit, used for controlling the switching circuit whether to receive an image pair captured by one image capture pair of the plurality of image capture pairs according to depth of a target object and the different working ranges;
- wherein when an object is located within the working range of the depth map corresponding to the each image capture pair, the processor does not misjudge a distance between the object and the depth map generation device.

6. The depth map generation device of claim 5, wherein the processor selects one of the plurality of depth maps to generate the blending depth map according to depth of a target object.

7. The depth map generation device of claim 5, wherein the processor determines to merge the part or the all of the plurality of depth maps to generate the blending depth map according to depth of at least one target object.

8. The depth map generation device of claim 5, wherein the depth map generation module generates a preset depth map according to an image pair captured by a preset image capture pair, the processor determines depth of at least one target object according to the preset depth map, and the processor determines to merge the part or the all of the plurality of depth maps according to the depth of the at least one target object.

* * * * *